United States Patent
Thomaschewski et al.

(10) Patent No.: US 10,232,944 B2
(45) Date of Patent: Mar. 19, 2019

(54) AIRCRAFT SEAT HAVING A HEAT TRANSPORT ELEMENT

(71) Applicant: LUFTHANSA TECHNIK AG, Hamburg (DE)

(72) Inventors: Oliver Thomaschewski, Norderstedt (DE); Andrew Muirhead, Norderstedt (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 15/553,482

(22) PCT Filed: Feb. 22, 2016

(86) PCT No.: PCT/EP2016/053654
§ 371 (c)(1),
(2) Date: Aug. 24, 2017

(87) PCT Pub. No.: WO2016/135087
PCT Pub. Date: Sep. 1, 2016

(65) Prior Publication Data
US 2018/0037326 A1 Feb. 8, 2018

(30) Foreign Application Priority Data
Feb. 24, 2015 (DE) .......................... 10 2015 203 308

(51) Int. Cl.
*B64D 11/06* (2006.01)
(52) U.S. Cl.
CPC ...... *B64D 11/0624* (2014.12); *B64D 11/0626* (2014.12)
(58) Field of Classification Search
CPC .................... B64D 11/0624; B64D 11/0626
(Continued)

(56) References Cited

U.S. PATENT DOCUMENTS 5,409,186 A * 4/1995 Chow .................... B64D 11/06
165/41
8,317,264 B2 11/2012 Merensky et al.
(Continued)

FOREIGN PATENT DOCUMENTS

DE        101 60 935         7/2003
DE   10 2009 006 758         8/2010
(Continued)

OTHER PUBLICATIONS

Examination Report from German Patent Office for Application No. 10 2015 203 308.2, dated Jan. 20, 2016, pp. 1-5.
(Continued)

*Primary Examiner* — Milton Nelson, Jr.
(74) *Attorney, Agent, or Firm* — Saliwanchik, Lloyd & Eisenschenk

(57) ABSTRACT

The present invention relates to an aircraft seat having a seat base, a seat unit, and a floor attachment assembly, where a first side of the seat base is configured to be fastened to the seat unit, and a second side of the seat base is configured to be fastened to the floor attachment assembly, and the floor attachment assembly is configured to be mechanically connected to a floor structure of an aircraft in order to fasten the aircraft seat to the aircraft, where the seat base is formed by at least one flexurally rigid shell component, where the shell component has a cavity for receiving at least one functional element, with the cavity being closed. A first heat-transfer element having an inner portion and an outer portion is provided, with the inner portion being assigned to the cavity and being in contact with the functional element in order to absorb thermal energy generated by the functional element, and the outer portion being assigned to an external environment of the shell component in order to dissipate the thermal
(Continued)

energy absorbed from the functional element to the environment.

19 Claims, 3 Drawing Sheets

(58) Field of Classification Search
USPC .......................................... 297/180.1, 217.3
See application file for complete search history.

(56) References Cited

U.S. PATENT DOCUMENTS

| | | |
|---|---|---|
| 9,238,506 B2 | 1/2016 | Krämer |
| 2007/0146998 A1 | 6/2007 | Sarno et al. |
| 2010/0201166 A1 | 8/2010 | Merensky et al. |
| 2013/0020846 A1 | 1/2013 | Krämer |

FOREIGN PATENT DOCUMENTS

| | | |
|---|---|---|
| DE | 10 2011 011 440 | 8/2011 |
| DE | 10 2012 208 719 | 11/2013 |
| DE | 20 2013 011 623 | 5/2014 |
| WO | WO 94/20327 | 9/1994 |
| WO | WO 2013/174517 | 11/2013 |

OTHER PUBLICATIONS

International Search Report for Application No. PCT/EP2016/053654, dated Apr. 8, 2016, pp. 1-6.

\* cited by examiner

AIRCRAFT SEAT HAVING A HEAT TRANSPORT ELEMENT

CROSS-REFERENCE TO RELATED APPLICATIONS

The present application is the U.S. National Stage Application of International Patent Application No. PCT/EP2016/053654, filed on Feb. 22, 2016, which claims priority to German Patent Application No. 10 2015 203 308.2, filed on Feb. 24, 2015, both of which are hereby incorporated by reference herein in their entirety, including any figures, tables, or drawings.

The present invention relates to an aircraft seat having the features of the preamble of claim 1.

DE 10 2012 208 719 A1 discloses an aircraft seat comprising a seat base consisting of a fibre-reinforced component, for example a carbon fibre reinforced component. The seat base is connected to the seat on a first side. The seat base is fastened to a floor attachment assembly on a second side so that a load-bearing mechanical connection can be established between the seat base and the floor structure of an aircraft.

In this case, the seat base is formed of a flexurally rigid shell component of cylindrical or conical geometry. This geometry is advantageous over a seat base formed by a framework in that greater rigidity can be achieved together with a low weight. The increased rigidity of the seat base means that, in the event of a crash, the centre of rotation of a deformation movement of the aircraft seat is moved towards the seat surface.

Furthermore, it is known from DE 10 2012 208 719 A1 to receive electronic devices or a functional object such as a pneumatic or hydraulic system in a cavity formed by the shell component. Arranging said devices or object inside the cavity is advantageous in that the electronic devices or functional objects are protected against environmental influences. Furthermore, the high rigidity of the shell component ensures that the electronic devices or functional objects are mechanically protected.

However, the arrangement of the electronic devices or functional objects in the cavity is disadvantageous in that adequate dissipation of the thermal energy from the cavity is not ensured. In particular, the electrical devices arranged in the cavity dissipate heat to the environment as a result of their thermal power loss. Since the cavity is closed, insufficient thermal energy is dissipated from the cavity to the environment by means of an air mass flow. Furthermore, the walls made of a fibre-reinforced material have a low degree of thermal conductivity so that only a small amount of thermal energy can be dissipated to the environment via the wall. The seat base structure known from DE 10 2012 208 719 A1 thus forms a largely thermally insulated cavity.

Due to the thermally insulating effect of the shell component and the thermal energy dissipated by the electronic devices and functional objects, heat can build up in the cavity. As a result, the electronic devices and functional objects can overheat, and therefore it is possible for the operating temperature to be exceeded and the system reliability properties of the system are therefore adversely affected. As a result, the aircraft seat cannot be used to its full extent, leading to a loss in comfort for the passenger. Furthermore, the increased temperature caused by a build-up of heat can have a negative effect on the material properties of the shell component, in particular the shell component made of composite fibre materials.

The object of the invention is to provide an aircraft seat, in which the properties of transferring heat from the cavity to the environment are improved while maintaining the strength properties of the shell component.

The object is achieved by the features of the independent claim.

According to the basic concept of the invention, an aircraft seat comprising a seat base is proposed, it being possible for a first side of the seat base to be fastened to a seat unit of the aircraft seat, and it being possible for a second side of the seat base to be fastened to a floor attachment assembly in order to fasten it to the aircraft, the seat base being formed by at least one flexurally rigid shell component, the shell component comprising a cavity for receiving at least one functional element, the cavity being closed, a first heat-transfer element comprising an inner and an outer portion being provided, the inner portion being assigned to the cavity and being in contact with the functional element in order to absorb thermal energy generated by the functional element, the outer portion being assigned to an external environment of the shell component in order to dissipate the thermal energy.

By means of the solution according to the invention, the thermal energy can be absorbed in the cavity from the inner portion of the first heat-transfer element. The absorbed thermal energy is then passed on to the outer portion so that the thermal energy can be dissipated from the cavity to the external environment. Furthermore, apertures for ventilating the shell component can thus be omitted, improving the stability of the shell component as a result. In this case, the external environment is understood to mean the space outside the cavity. This also includes components of the aircraft seat, including the seat base and the seat unit, which lie outside the cavity. In principle, it can be assumed that the temperature in the cavity is higher than in the external environment as a result of the heat-generating functional elements, i.e. the functional element heats the cavity.

The shell component is preferably an evenly curved structure. The shell component is preferably tubular or in the shape of a hollow cylinder, the axis of which is vertical when said component is installed. The shell component transfers all mechanically relevant loads between the seat unit and the floor attachment assembly.

The cavity itself is formed by the shell component, which is closed on the top and on the bottom. The shell component is preferably closed on the top by a component of the seat unit, while the floor attachment assembly preferably closes the cavity on the bottom.

The component of the seat unit preferably serves also as the first heat-transfer element. As a result, in this advantageous embodiment all mechanical loads that have to be transferred from the floor attachment assembly to the seat unit and to a passenger can be introduced into the first heat-transfer element. The heat-transfer element is therefore a load-bearing structure, i.e. it transfers forces, inter alia, consisting of applied accelerations to the seat structure, which accelerations are a multiple of, preferably more than 50 times, the loads which result from the acceleration on the mass of the heat-transfer element.

The first heat-transfer element thus forms a heat sink, which absorbs the thermal energy in the cavity in a spatially delimited space, specifically in the region of the first portion, and then dissipates it to the external environment. The first heat-transfer element is therefore characterised in that the thermal energy is absorbed by the inner portion in a spatially directed manner, and then dissipated to the external environment via the outer portion. In the context of the invention, a heat-transfer element is therefore not understood to be associated with uniform dissipation of the thermal energy from the cavity via the walls formed by the shell component, the floor attachment assembly and/or the seat unit.

The first heat-transfer element is preferably arranged on the top, i.e. on the side facing the seat unit. More preferably, the first heat-transfer element is therefore also used to distinguish the cavity from the external environment, i.e. the cavity is preferably formed by the first heat-transfer element, at least in part. The first heat-transfer element advantageously only takes up less than 50%, more preferably less than 25% and particularly preferably less than 15% of the inner surface of the cavity.

It is further proposed for the material of the first heat-transfer element to comprise a higher thermal conductivity than the material of the shell component. Owing to the higher degree of thermal conductivity of the first heat-transfer element, the heat can be directed out of the cavity and dissipated to the external environment, i.e. the heat flow dissipated by the first heat-transfer element is multiple times larger than, preferably more than twice as large as, the heat flow dissipated by the shell component. This is also advantageous in that the heat can be transferred from the cavity to the external environment more effectively.

It is also proposed for the shell component to be made of composite fibre material, in particular carbon fibre reinforced plastics materials. The proposed solution allows the shell component to be produced having very high strength together with a low weight. In this case, it is possible to accept the disadvantage of the low degree of thermal conductivity of the composite fibre material due to the solution according to the invention.

More preferably, the first heat-transfer element is formed by a metal component. A metal material is advantageous since it has a high degree of thermal conductivity and at the same time meets stability requirements. The first heat-transfer element can therefore also be economical to produce and can additionally be easily connected to the structure of the aircraft seat, for example the seat base.

It is advantageous for the outer portion of the first heat-transfer element to be connected to an external component of the seat base and/or the seat unit. As a result, the thermal energy stored in the first heat-transfer element can be dissipated to the fluid surrounding the outer portion, for example the air, by ways other than just radiation and/or convection.

As a result of the contact between the first transfer element and an external component of the seat base and/or the seat unit, heat is transferred between these components so that the thermal energy stored in the first heat-transfer element can be efficiently dissipated to this preferably metal component. Heat is then also transferred to the additional environment via the external components. Overall, increased dissipation of the thermal energy from the first heat-transfer element is thus achieved.

The outer portion of the first heat-transfer element is preferably arranged between the seat base and the seat unit. As a result of this arrangement, the first heat-transfer element can be positioned on the top of the seat base, which is formed by a shell component. At the same time, the first heat-transfer element is therefore arranged in close proximity to the seat unit. More preferably, the first heat-transfer element is connected to the seat unit by means of the outer portion. The thermal energy of the first heat-transfer element can therefore be directly dissipated to the seat unit, improving heat dissipation.

In an advantageous embodiment, the first heat-transfer element is designed as a connection means for connecting the seat unit to the seat base. As a result of this functional integration, the connection means required for connecting the seat unit to the seat base in any case can also be used to transport heat from the cavity to the external environment. The connection means is preferably formed as a metal flange.

In preferred embodiments, the functional element or the functional elements is/are fastened to the connection means by means of a releasable connection means, in particular screws, thermally conductive paste being arranged in a resultant contact region between the connecting element or the first heat-transfer element and the functional element. This improves the dissipation of heat from the functional element to the connection element or to the first heat-transfer element.

It is also proposed for at least two separate functional elements to be provided in the cavity. In this case, the at least two functional elements can preferably be identical or fulfil the same function in order to increase the system reliability by redundancy. However, different types of functional elements can preferably also be arranged in the cavity, e.g. a seat control system and an in-flight entertainment system.

More preferably, the separate functional elements are arranged horizontally and/or vertically with respect to one another. A vertical arrangement means in particular an arrangement in which the functional elements are arranged stacked one on top of the other. A horizontal arrangement is understood to mean that the functional elements are arranged in a horizontal plane, for example in the shape of a cake slice. Furthermore, a horizontal arrangement can be understood to mean an arrangement of functional elements next to one another.

In advantageous embodiments, the functional element is suspended in the cavity of the seat base, said functional element being fastened to the bottom of the first heat-transfer element.

A suspended arrangement is advantageous since heat can additionally be transferred from the functional element to the first heat-transfer element by means of free convection.

A second heat-transfer element is advantageously provided in the cavity. The second heat-transfer element is preferably connected to the first heat-transfer element at its first end. A second end of the second heat-transfer element is arranged inside the cavity such that it can absorb the thermal energy of a heat source, for example the heat from the functional element, as efficiently as possible. The thermal energy is therefore effectively dissipated from any point in the cavity to the external environment by means of the second and first heat-transfer element.

It is also advantageous for the second heat-transfer element to be formed by a heat pipe. By using the heat pipe, heat can be effectively transferred from the functional elements to the first heat-transfer element.

The second heat-transfer element is preferably provided for thermally coupling the functional elements to one another. Where there is a plurality of functional elements, heat can therefore be transported between the individual functional elements, for example. As a result, every functional element does not have to be directly connected to the first heat-transfer element, for example.

By thermally coupling the functional elements to one another, the heat generated during operation can also be effectively distributed among the corresponding functional elements. The heat from a very hot functional element can therefore be transferred to a cooler functional element, for example, in order to equalise it.

The functional elements can preferably also be electronically interconnected.

More preferably, a first functional element is thermally coupled to the first heat-transfer element by means of the second heat-transfer element. In this case, the second end of the second heat-transfer element is preferably thermally coupled to a first functional element. Alternatively or additionally, an intermediate portion of the second heat-transfer element, which is arranged between the first and a second end of the second heat-transfer element, can also be thermally coupled to a functional element.

Within the context of this application, a thermal coupling is understood to mean a coupling between at least two objects, the coupling causing the thermal conductivity to be greater at the coupling point than in the ambient air. This is preferably formed by the contact between two metal surfaces of said objects. More preferably, this contact is improved using thermally conductive paste, which is arranged at the coupling point.

Connecting the functional elements to the first heat-transfer element by means of the second heat-transfer element can ensure that the heat from the functional elements can be effectively passed on to the first heat-transfer element, substantially independently of their arrangement inside the cavity.

It is also proposed for the second heat-transfer element to extend through the second functional element. By means of this arrangement, the second end of the second heat-transfer element is thermally coupled to the first functional element. The second heat-transfer element then passes through the second functional element, which is arranged between the inner portion of the heat-transfer element and the first functional element in this embodiment so as to allow for direct connection of the first functional element to the first heat-transfer element. This direct connection allows for effective heat transfer from the first functional element to the environment by means of the second and the first heat-transfer element.

Since the second heat-transfer element extends through the second functional element, the second functional element can also be thermally coupled to the second heat-transfer element. In addition to the thermal energy of the first functional element, the thermal energy of the second functional element is therefore also absorbed by the second heat-transfer element and passed on to the first heat-transfer element. The two functional elements are therefore thermally connected in series.

An additional second heat-transfer element for thermally coupling the second functional element to the first heat-transfer element, i.e. a thermal parallel connection, is therefore not necessary.

The inner portion of the first heat-transfer element is preferably arranged relative to the functional element such that convective heat transfer is possible between the functional element and the inner portion of the first heat-transfer element. For this purpose, a fluidic connection is provided between the functional element and the first heat-transfer element. In this case, the functional element is preferably designed to have as large a vertical external surface as possible, past which the fluid being heated up, preferably air, can flow.

More preferably, the functional element is arranged beneath the first heat-transfer element such that the fluid heated at the vertical surfaces flows past the first heat-transfer element so as to dissipate the thermal energy to the first heat-transfer element. A portion of the thermal energy generated by the functional element is therefore dissipated to the first heat-transfer element by means of convection.

It is also advantageous for the functional element to comprise, in the interior thereof, a first flow duct that extends from an opening in the top up to an opening in the bottom. The flow duct is preferably cylindrical and vertical. More preferably, the flow duct is arranged in the centre of the functional element such that the thermal energy of the functional element can be uniformly dissipated to the air flowing through the flow duct.

The opening in the top is preferably fluidically connected to the opening in the bottom by means of a second flow duct so that a circulation of the air is enabled. In a preferred embodiment, the second flow duct is formed by the intermediate space created between the inner wall of the cavity and the outer wall of the functional element.

In particular, by combining the different heat-transfer mechanisms, effective heat transfer from the functional elements to the external environment by means of the first heat-transfer element can be ensured.

The invention will be explained in the following on the basis of preferred embodiments, and with reference to the accompanying figures, in which.

Figure 1:
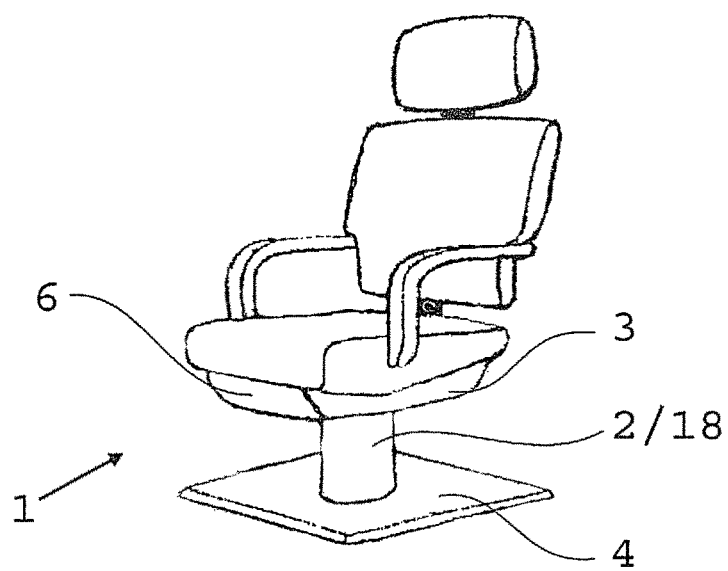
FIG. 1 shows an aircraft seat according to the invention.

FIG. 1 shows an aircraft seat 1 according to the invention, comprising a seat base 2. The seat base 2 is connected to a seat unit 3 on a first side. On a second side, the seat base 2 is fastened to a floor attachment assembly 4. By means of the floor attachment assembly 4, a rigid mechanical connection can be established between the seat base 2 and a floor structure of an aircraft.

The seat base 2 produces the mechanical connection between the floor attachment assembly 4 and the seat unit 3. In an advantageous embodiment, the seat base 2 is very rigid, and therefore crash loads in a direction of the floor plane only lead to small shifts on the first side of the seat base 2, largely preventing rotation or tipping of the aircraft seat 1.

Figure 2:
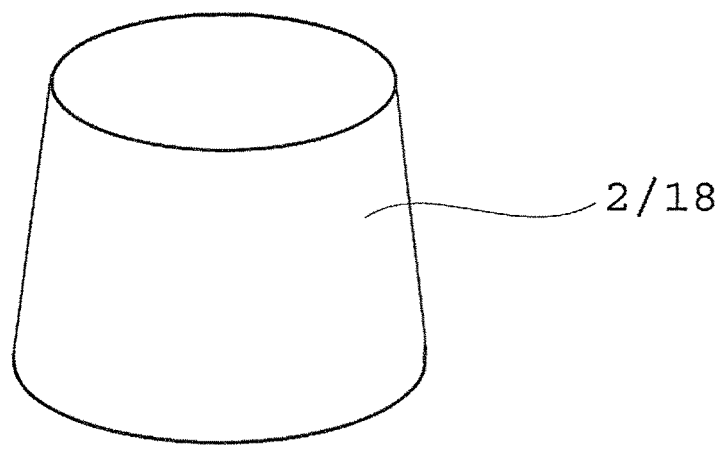
FIG. 2 shows a shell-shaped seat base.

FIG. 2 shows a detail of a seat base 2, which preferably has an elliptical cross section and the shape of a cone portion so that the cross-sectional surfaces of the seat base 2 on the first and second side are different sizes. Alternatively, however, a cylindrical geometry is also conceivable. The basic structure of the seat base 2 is a flexurally rigid shell component 18, which is curved in the circumferential direction in this embodiment. The flexural rigidity of the seat base 2 can be improved as a result and can be designed such that, in the event of a crash, the seat base 2 performs as small a translational movement as possible relative to the floor plane on its first side.

The shell component 18 is preferably made of a composite fibre material, more preferably of a carbon fibre reinforced plastics material. The shell component 18 is preferably made of a non-metal material.

Figure 3:
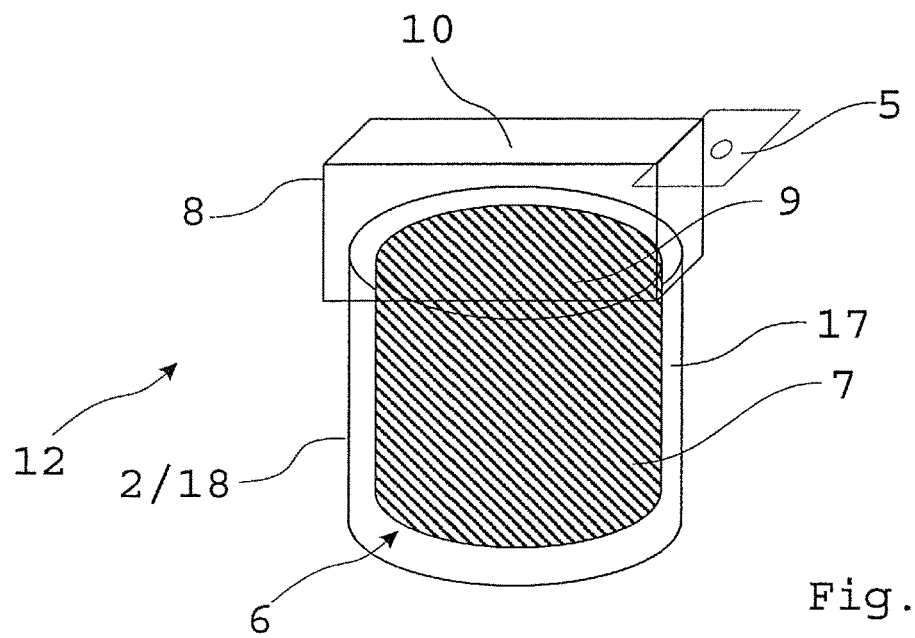
FIG. 3 shows a first embodiment of the invention, comprising a shell-shaped seat base having a functional element and a first heat-transfer element.

FIG. 3 shows a first embodiment of the invention, comprising a single functional element 7. The functional element 7 is preferably formed by an electrical, pneumatic or hydraulic system that dissipates heat due to thermal power loss.

FIG. 3 shows that a first heat-transfer element 8 is provided at the upper end of the seat base 2. The seat base 2 is closed at the lower end by the floor attachment assembly 4 (see FIG. 1). The seat base 2, the first heat-transfer element 8 and the floor attachment assembly 4 thus form a cavity 6. In addition to the heat-transfer element 8, the cavity 6 can also be closed at the upper end by the seat unit 3. The first heat-transfer element 8 comprises a higher thermal conductivity than the shell component 18, the first heat-transfer element 8 preferably being metal.

In the context of this application, the cavity 6 is not necessarily understood to mean a hermetically sealed inner space; in complete contrast to the overall inner surface, the cavity 6 can therefore comprise small openings or gaps. What matters here is that, even with tiny openings, sufficient exchange of heat with an external environment 12 cannot take place.

Furthermore, the first heat-transfer element 8 comprises an inner and an outer portion 9 and 10. The inner portion 9 is assigned to the cavity 6 in this case. This either means that the inner portion 9 protrudes into the cavity 6, or that the inner portion 9 itself forms part of the inner surface of the cavity 6. The outer portion 10 is assigned to an external environment 12 of the seat base 2 in order to dissipate the thermal energy.

The first heat-transfer element 8 is preferably formed by a metal flange, by means of which a mechanical connection can also be established between the shell component 18 and the first heat-transfer element 8. The first heat-transfer element 8 therefore not only fulfils a heat-transfer function, but also the function of fastening the seat base 2 to the seat unit 3.

The functional element 7 is also positioned in the cavity 6 by means of the first heat-transfer element 8. The functional element 7 is fastened to the inner portion 9 of the first heat-transfer element 8 such that the functional element 7 and the first heat-transfer element 8 can also be thermally coupled.

The first heat-transfer element 8 is fastened to an external component of the aircraft seat 1, preferably to a metal component, by its outer end 10. In order to fasten the outer end 10 to the component of the aircraft seat 1, a fastening means 5 is preferably provided, which is preferably also metal.

Owing to the above-described construction of the first embodiment, the functional element 7 is cooled. In order to explain the functionality, it is presumed that, during operation, the temperature of the functional elements 7 is greater than the temperature of the external environment 12. Overall, as a result of the closed cavity 6, an insulating effect is achieved such that, as well as the functional element 7, the air inside the cavity 6 is also heated.

The thermal coupling between the first heat-transfer element 8 and the functional element 7 is designed such that these elements are either in direct contact or are in indirect contact by means of connecting means so that heat can be conducted between the first heat-transfer element 8 and the functional element 7. Heat is further transferred at the surfaces of the functional element 7 and of the first heat-transfer element 8, which surfaces are opposite one another, by means of radiation.

The functional element 7 is preferably cylindrical, a flow cross section 17 being formed, when said functional element is installed, between the inner wall of the cavity 6 formed by the seat base 2 and the lateral surface of the functional element 7, which flow cross section extends over the entire height of the functional element 7. A fluidic connection is also established between said flow cross section 17 and the inner portion 9 so that convective heat transfer is possible between the functional element 7 and the inner portion 9.

By means of the above-described heat-transfer mechanism, thermal energy of the functional element 7 is transferred to the first heat-transfer element 8, heating it. Therefore, the temperature of the outer portion 10 also increases until it is greater than the temperature of the external environment 12. This temperature gradient causes heat to be dissipated from the outer portion 10 to the external environment 12. This cooling effect can be increased further by fastening the outer portion 10 to a component of the aircraft seat 1, as already described. As a result, certain external components of the aircraft seat 1 can be used as a heat-dissipation element having a larger surface compared with the outer portion 10.

Overall, the solution according to the invention therefore allows for heat to be transferred from the functional element 7 by means of the first heat-transfer element 8 and by means of external components of the aircraft seat 1.

Figure 4:
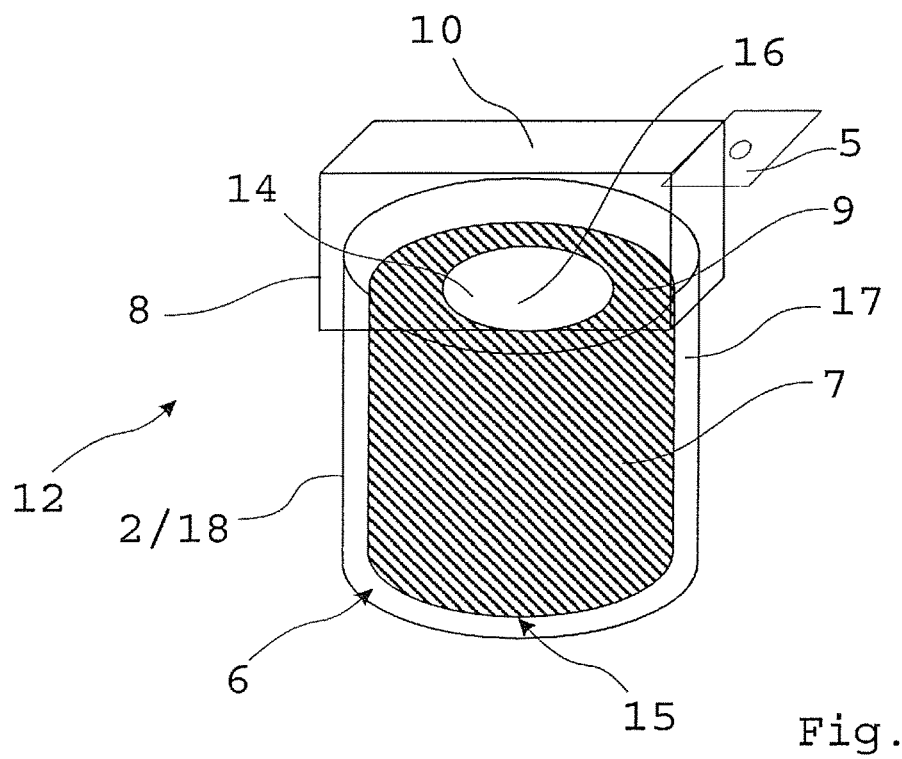
FIG. 4 shows a second embodiment of the invention, comprising a shell-shaped seat base having a functional element comprising a flow duct.

FIG. 4 shows a second embodiment of the invention, the basic structure of which does not differ from that in the first embodiment. The following therefore only sets out the differences between the first and the second embodiment.

In comparison with the first embodiment, the second embodiment comprises a flow duct 16, which preferably extends from a central opening 14 in the top of the functional element 7 up to a central opening 15 in the bottom of the functional element 7. The flow duct 16 therefore forms a kind of chimney that extends over the entire height of the functional element 7.

The air inside the chimney is therefore heated and rises as a result. The flow duct 16 is preferably fluidically connected to the inner portion 9 of the first heat-transfer element 8 so that the thermal energy of the heated air can be transferred to the first heat-transfer element 8.

Furthermore, another fluidic connection is preferably provided between the opening 14 in the top and the opening 15 in the bottom of the functional element 7, which connection is formed by the flow cross section 17 that is already known from the first embodiment.

The air mass inside the flow channel 16 is therefore heated by the dissipated heat from the functional element 7, and therefore flows towards the inner portion 9, where some of the thermal energy of the air mass flow is transferred to the inner portion 9. The cooled air mass can then flow back to the opening 15 in the bottom of the functional element 7 via the flow cross section 17. This circulation effect increases the convective heat transfer between the functional element 7 and the first heat-transfer element 8.

Figure 5:
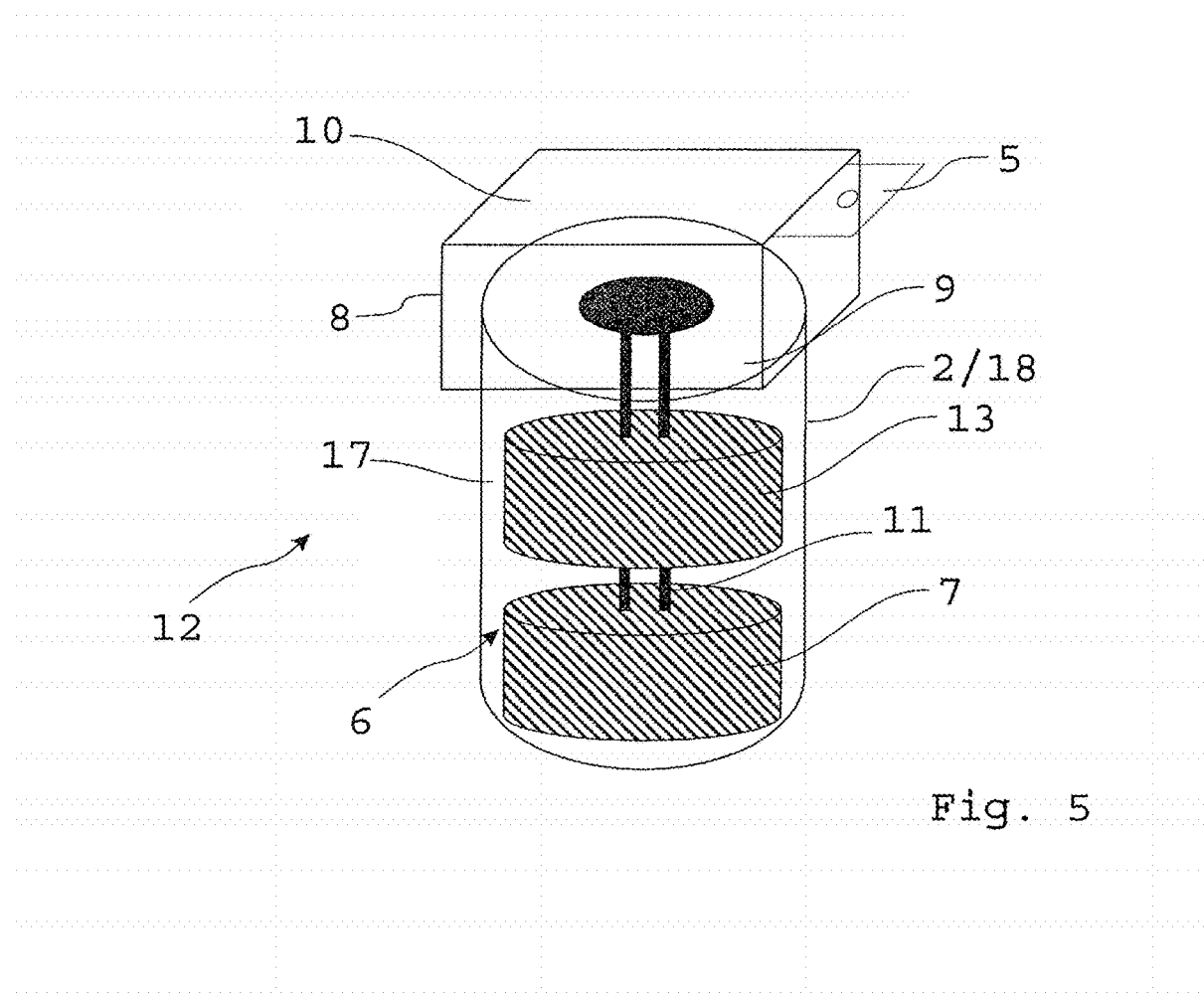
FIG. 5 shows a third embodiment of the invention, comprising a shell-shaped seat base having a second heat-transfer element.

FIG. 5 shows a third embodiment of the invention, which is also a modification of the first embodiment.

In the third embodiment, a second heat-transfer element 11 is provided, which thermally couples the inner portion 9 to at least one functional element 7 or 13. The second heat-transfer element 11 is preferably formed by a heat pipe. A cooling zone of the heat pipe is assigned to the inner portion 9 in this embodiment.

Furthermore, FIG. 5 shows two functional elements 7 and 13 arranged vertically one on top of the other. The first functional element 7 is arranged below the second functional element 13 in this figure, both the first and the second functional element 7 and 13 being coupled to the second heat-transfer element 11. In this embodiment, the second heat-transfer element 11 is formed by two heat pipes, each of which is coupled to the first and the second functional element 7 and 13.

The second heat-transfer element 11 is thermally coupled to the inner portion 9 at a first end, and the second end of the second heat-transfer element 11 is thermally coupled to the first functional element 7. The second heat-transfer element 11 passes through the second functional element 13 in this case, a thermal coupling preferably also being provided between the second functional element 13 and the second heat-transfer element 11. The thermal energy can thus be transferred from the first and second functional element 7 and 13 to the inner portion 9 by means of the second heat-transfer element 11.

Heat is transferred from the inner portion 9 to the outer portion 10 inside the first heat-transfer element 8 so that the thermal energy can be dissipated therefrom to the external environment 12.

Figure 6:
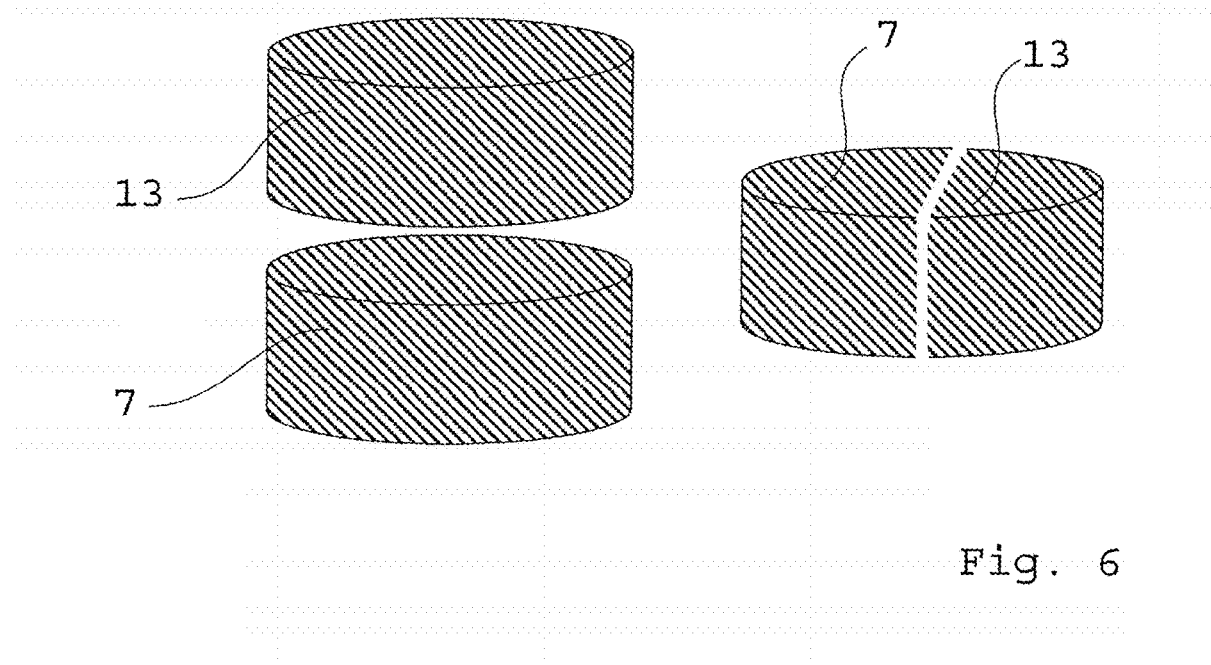
FIG. 6 shows different arrangements of the functional elements.

FIG. 6 also shows different arrangements of the functional elements 7 and 13. A vertical arrangement of two functional elements 7 and 13 is shown on the left in FIG. 6, although this design is not limited to two functional elements 7 and 13. On the contrary, the functional elements 7 and 13 are arranged in a horizontal plane on the right in FIG. 6. In this figure, the two functional elements 7 and 13 are arranged in the form of cake slices. This embodiment is not limited to two functional elements 7 and 13, either.

It is advantageous for the functional elements 7 and 13 to already be pre-assembled relative to one another prior to installation in the shell component 18.

Absolutely any combinations of the embodiments shown in FIG. 1 to FIG. 6 can be added to the disclosure of this application.

The invention claimed is:

1. An aircraft seat, comprising:
   a seat base;
   a seat unit;
   a floor attachment assembly;
   at least one functional element; and
   a first heat-transfer element,
   wherein:
      a first side of the seat base is fastened to the seat unit; and
      a second side of the seat base is fastened to the floor attachment assembly, such that when the floor attachment assembly is mechanically connected to a floor structure of an aircraft, the seat base is mechanically connected to the floor structure of the aircraft,
   wherein the seat base is formed by at least one flexurally rigid shell component,
   wherein the seat base, the seat unit, the floor attachment assembly, and the first heat-transfer element form a cavity,
   wherein the at least one functional element is positioned in the cavity,
   wherein the cavity is closed,
   wherein the first heat-transfer element comprises:
      an inner portion; and
      an outer portion,
   wherein the inner portion is in thermal contact with the at least one functional element, such that when a temperature of a first functional element of the at least one functional element is higher than a temperature of the inner portion, the inner portion absorbs thermal energy generated by the first functional element of the at least one functional element,
   wherein when a temperature of the outer portion is higher than a temperature of an external environment outside of the cavity, the outer portion dissipates thermal energy to the external environment outside of the cavity,
   wherein when the temperature of the first functional element of the at least one functional element is higher than the temperature of the external environment outside of the cavity:
      the inner portion absorbs thermal energy generated by the first functional element of the at least one functional element; and
      the outer portion dissipates the thermal energy, generated by the first functional element of the at least one functional element, and absorbed by the inner portion, to the external environment outside of the cavity,
   wherein the first heat-transfer element has a first thermal conductivity,
   wherein the at least one flexurally rigid shell component has a second thermal conductivity, and
   wherein the first thermal conductivity is higher than the second thermal conductivity.

2. The aircraft seat according to claim 1,
   wherein the at least one functional element is suspended in the cavity, and fastened to a bottom of the first heat-transfer element.

3. The aircraft seat according to claim 1,
   wherein the outer portion is connected to:
      an external component of the seat base;
      an external component of the seat unit; or
      an external component of the seat base and an external component of the seat unit.

4. The aircraft seat according to claim 1,
   wherein the outer portion is arranged between the seat base and the seat unit.

5. The aircraft seat according to claim 1,
   wherein the first heat-transfer element is configured to connect to the seat base and connect to the seat unit, such that the seat base is fastened to the seat unit.

6. The aircraft seat according to claim 1,
   wherein the inner portion is arranged relative to the first functional element of the at least one functional element, such that convective heat transfer is possible between the first functional element of the at least one functional element and the inner portion.

7. The aircraft seat according to claim 1,
   wherein the first heat-transfer element is made of a first material,
   wherein the at least one flexurally rigid shell component is made of a second material,
   wherein the first material has the first thermal conductivity, and
   wherein the second material has the second thermal conductivity.

8. The aircraft seat according claim 7,
   wherein the at least one shell component is made of a composite fiber material.

9. The aircraft seat according to claim 1,
   wherein the at least one functional element is at least two functional elements, and
   wherein the at least two functional elements are positioned in the cavity.

10. The aircraft seat according to claim 9,
wherein the functional elements of the at least two functional elements are arranged:
horizontally with respect to one another;
vertically with respect to one another; or
horizontally and vertically with respect to one another.

11. The aircraft seat according to claim 1,
wherein when the aircraft seat is positioned within an aircraft, in an interior environment of the aircraft, such that the interior environment of the aircraft is the external environment outside the cavity, and the temperature of the first functional element of the at least one functional element is higher than a temperature of the interior environment of the aircraft:
the inner portion absorbs thermal energy generated by the first functional element of the at least one functional element; and
the outer portion dissipates the thermal energy, generated by the first functional element of the at least one functional element, and absorbed by the inner portion, to the interior environment of the aircraft.

12. The aircraft seat according to claim 11,
wherein the inner portion is arranged relative to the first functional element of the at least one functional element, such that convective heat transfer is possible between the first functional element of the at least one functional element and the inner portion, and
wherein the first functional element of the at least one functional element comprises:
a first flow duct,
wherein the first flow duct extends through the first functional element of the at least one functional element, from an opening in a top of, to an opening in a bottom of, the first functional element of the at least one functional element.

13. An aircraft seat, comprising:
a seat base;
a seat unit;
a floor attachment assembly;
at least two functional elements; and
a first heat-transfer element,
wherein:
a first side of the seat base is fastened to the seat unit; and
a second side of the seat base is fastened to the floor attachment assembly, such that when the floor attachment assembly is mechanically connected to a floor structure of an aircraft, the seat base is mechanically connected to the floor structure of the aircraft,
wherein the seat base is formed by at least one flexurally rigid shell component,
wherein the seat base, the seat unit, the floor attachment assembly, and the first heat-transfer element form a cavity,
wherein the at least two functional elements are positioned in the cavity,
wherein the cavity is closed,
wherein the first heat-transfer element comprises:
an inner portion; and
an outer portion,
wherein the inner portion is in thermal contact with the at least two functional elements, such that when a temperature of a first functional element of the at least two functional elements is higher than a temperature of the inner portion, the inner portion absorbs thermal energy generated by the first functional element of the at least two functional elements,
wherein when a temperature of the outer portion is higher than a temperature of an external environment outside of the cavity, the outer portion dissipates thermal energy to the external environment outside of the cavity, and
wherein when the temperature of the first functional element of the at least two functional elements is higher than the temperature of the external environment outside of the cavity:
the inner portion absorbs thermal energy generated by the first functional element of the at least two functional elements; and
the outer portion dissipates the thermal energy, generated by the first functional element of the at least two functional elements, and absorbed by the inner portion, to the external environment outside of the cavity; and
a second heat-transfer element,
wherein the second heat-transfer element is provided in the cavity.

14. The aircraft seat according to claim 13,
wherein the second heat-transfer element thermally couples the functional elements of the at least two functional elements to one another.

15. The aircraft seat according to claim 13,
wherein the first functional element of the at least two functional elements is thermally coupled to the first heat-transfer element by the second heat-transfer element.

16. The aircraft seat according to claim 13,
where the second heat-transfer element is formed by a heat pipe.

17. The aircraft seat according to claim 16,
wherein the second heat-transfer element thermally couples the functional elements of the at least two functional elements to one another.

18. The aircraft seat according to claim 16,
wherein the first functional element of the at least two functional elements is thermally coupled to the first heat-transfer element by the second heat-transfer element.

19. An aircraft seat, comprising:
a seat base;
a seat unit;
a floor attachment assembly;
at least one functional element; and
a first heat-transfer element,
wherein:
a first side of the seat base is fastened to the seat unit; and
a second side of the seat base is fastened to the floor attachment assembly, such that when the floor attachment assembly is mechanically connected to a floor structure of an aircraft, the seat base is mechanically connected to the floor structure of the aircraft,
wherein the seat base is formed by at least one flexurally rigid shell component,
wherein the seat base, the seat unit, the floor attachment assembly, and the first heat-transfer element form a cavity,
wherein the at least one functional element is positioned in the cavity,
wherein the cavity is closed, wherein the first heat-transfer element comprises:
an inner portion; and
an outer portion,
wherein the inner portion is in thermal contact with the at least one functional element, such that when a temperature of a first functional element of the at least one functional element is higher than a temperature of the inner portion, the inner portion absorbs thermal energy generated by the first functional element of the at least one functional element,
wherein when a temperature of the outer portion is higher than a temperature of an external environment outside of the cavity, the outer portion dissipates thermal energy to the external environment outside of the cavity,
wherein when the temperature of the first functional element of the at least one functional element is higher than the temperature of the external environment outside of the cavity:
the inner portion absorbs thermal energy generated by the first functional element of the at least one functional element; and
the outer portion dissipates the thermal energy, generated by the first functional element of the at least one functional element, and absorbed by the inner portion, to the external environment outside of the cavity, wherein the inner portion is arranged relative to the first functional element of the at least one functional element, such that convective heat transfer is possible between the first functional element of the at least one functional element and the inner portion, and wherein the first functional element of the at least one functional element comprises:

a first flow duct, wherein the first flow duct extends through the first functional element of the at least one functional element, from an opening in a top of, to an opening in a bottom of, the first functional element of the at least one functional element.

* * * * *